United States Patent [19]

Nagata et al.

[11] Patent Number: 4,977,313
[45] Date of Patent: Dec. 11, 1990

[54] FACSIMILE EQUIPMENT WITH DIRECT-CONTACT-TYPE IMAGE SENSOR

[75] Inventors: Tatsuya Nagata, Ibaraki; Takehiko Yamada; Eiichi Hara, both of Chigasaki; Michihiro Watanabe, Tsuchiura, all of Japan

[73] Assignee: Hitachi, Ltd., Tokyo, Japan

[21] Appl. No.: 517,810

[22] Filed: May 2, 1990

Related U.S. Application Data

[62] Division of Ser. No. 321,881, Mar. 10, 1989, Pat. No. 4,940,888.

[30] Foreign Application Priority Data

Mar. 14, 1988 [JP] Japan ................... 63-58310

[51] Int. Cl.$^5$ ............ H01J 40/14; H04N 1/024
[52] U.S. Cl. .................. 250/208.1; 358/482
[58] Field of Search ............ 250/211 J, 208.1; 358/482, 471; 357/30L

[56] References Cited

U.S. PATENT DOCUMENTS

| | | | |
|---|---|---|---|
| 4,354,104 | 10/1982 | Chikamura et al. | 250/578 |
| 4,497,974 | 2/1985 | Deckman et al. | 357/30 |
| 4,556,790 | 12/1985 | Glass et al. | 250/211 J |
| 4,672,221 | 6/1987 | Saito et al. | 250/211 J |
| 4,691,244 | 9/1987 | Cannella et al. | 357/30 |
| 4,740,710 | 4/1988 | Arita | 250/578 |
| 4,820,915 | 4/1989 | Hamakawa et al. | 250/211 J |
| 4,835,595 | 5/1989 | Oho et al. | 250/211 J |
| 4,845,375 | 7/1989 | Tsushima | 250/211 J |
| 4,908,718 | 3/1990 | Shimada | 250/208.1 |

FOREIGN PATENT DOCUMENTS

| | | | |
|---|---|---|---|
| 0088482 | 5/1985 | Japan | 357/30 |
| 61-41268 | 2/1986 | Japan | |
| 0084862 | 4/1986 | Japan | 357/30 |
| 0161757 | 7/1986 | Japan | 357/30 |

OTHER PUBLICATIONS

*Nikkei Electronics* No. 434, 11/87, pp. 207-221.

*Primary Examiner*—David C. Nelms
*Assistant Examiner*—Michael Messinger
*Attorney, Agent, or Firm*—Antonelli, Terry, Stout & Kraus

[57] ABSTRACT

In a contact-type image sensor for use in a facsimile equipment or the like, the surface of the sensor is provided with a transparent film which is electroconductive and of which the surface that is in contact with the sensor elements is formed as a roughened surface capable of scattering light. By virtue of the provision of this film, static electricity generated during the running of the original is prevented from causing fluctuations in the sensor output voltage. In addition, light reflected by the surface of the transparent film is prevented from becoming directly incident on the sensor elements and, hence, from causing abnormal increases in the sensor output.

9 Claims, 2 Drawing Sheets

FACSIMILE EQUIPMENT WITH DIRECT-CONTACT-TYPE IMAGE SENSOR

This application is a divisional application of application Ser. No. 07/321,881, filed Mar. 10, 1989 now U.S. Pat. No. 4,940,888.

BACKGROUND OF THE INVENTION

1. Field of the Invention

The present invention relates to an image sensor of the direct-contact type and an assembly in which such a read sensor is employed and, more particularly, to the structure of a direct-contact-type image sensor and a sensor assembly employing such an image sensor that are suitable for use as apparatus which may be incorporated in the reading section of, for instance, facsimile equipment and which require no condenser lens.

2. Description of the Prior Art

A conventional direct-contact-type image sensor has a structure in which a sheet of glass which has been subjected to electroconductivity treatment is mounted on the sensor substrate, as shown in NIKKEI ELECTRONICS (No. 434), 1987, pages 207-221.

The above-described prior art in which a thin sheet of glass having a thickness on the order of 50 μm is mounted on the sensor substrate, calls for a great amount of labor during assembly because such a thin sheet of glass tends to be broken while being handled.

SUMMARY OF THE INVENTION

It is an object of the present invention to provide an image sensor of the direct-contact type and a sensor assembly employing such an image sensor, which can be manufactured easily and can provide stable reading performance.

The above-stated object is achieved by adopting a transparent electroconductive film instead of glass. Although it was at first thought that the use of such a film might be disadvantageous because of plasticity and vulnerability to flaw-formation, experiments conducted by the present inventors have made it clear that the adoption of such a film does not lead to any serious problem actually, and that it can provide very advantageous effects.

A direct-contact-type image sensor according to the present invention comprises: a plurality of sensor elements; a sensor element mounting substrate on which the group of the sensor elements are mounted and which is light-transmissive at least in the vicinity of the portions where the sensor elements are mounted; and an electroconductive transparent resin-film disposed on the upper surface of the substrate in such a manner as to cover the group of the sensor elements.

Another direct-contact-type image sensor according to the present invention comprises: a plurality of sensor elements; a sensor element mounting substrate on which the group of the sensor elements are mounted and which is light-transmissive at least in the vicinity of the portions where the sensor elements are mounted; and an electroconductive transparent film disposed on the upper surface of the substrate in such a manner as to cover the group of the sensor elements, one surface of the film being formed with fine surface irregularities at least on the side facing the surface of the sensor elements and at portions in the vicinity of the sensor elements.

A still another direct-contact-type image sensor according to the present invention comprises: a plurality of sensor elements; a sensor element mounting substrate on which the group of the sensor elements are mounted and which is light-transmissive at least in the vicinity of the portions where the sensor elements are mounted; and an electroconductive transparent film disposed on the upper surface of the substrate in such a manner as to cover the group of the sensor elements, one surface of the film forming an incident-light scattering surface at least on the side facing the surface of the sensor elements and at portions in the vicinity of the sensor elements.

The direct-contact-type image sensor according to the present invention comprises: a plurality of sensor elements; a sensor element mounting substrate on which the sensor elements are mounted and which is light-transmissive at least in the vicinity of the portions where the sensor elements are mounted; and an electroconductive transparent resin film and a non-electroconductive film disposed on the upper surface of the substrate in such a manner as to cover the group of the sensor elements, one surface of the non-electroconductive film being formed with surface irregularities at least on the side facing the surface of the sensor elements and at portions in the vicinity of the sensor elements.

An image sensor assembly according to the present invention comprises: an incident-light optical path the formation of which is ensured on the reverse side of the light-transmissive portions of the above-specified direct-contact-type image sensor; and a platen roller capable of coming into contact through paper with the outer side of the electroconductive film and in the vicinity of the group of the sensor elements.

The read sensor assembly according to the present invention may preferably comprise a light source disposed within a base on which the sensor element mounting substrate is mounted, for the purpose of ensuring the formation of the optical path.

The fine surface irregularities on the above-specified surface of the film may be formed by, most preferably, a process of forming a pear-skin-like matted (or roughened) surface. Preferable structures are achieved by, for example, subjecting one surface of an electroconductive film to a pear-skin-like matted surface forming process, and disposing the thus-formed pear-skin-like surface on the upper surface of the sensor elements, or subjecting one surface of a transparent film to a pear-skin-like matted surface forming process, disposing the thus-formed pear-skin-like surface on the upper surface of the sensor elements, and disposing an electroconductive transparent film on the pear-skin-like matted film.

The electroconductive film may be disposed on (bonded to) the upper surface of the sensor substrate in either of direct and indirect manners.

The pear-skin-like surface specified here is a surface having fine surface irregularities which cause variations in the optical path of light being reflected or transmitted and which thus cause the light to be scattered. Preferably, the surface has: a surface roughness of about 0.2 to 10 μm, this value being in terms of the average height; and a light transmittance of not less than 70%, this value being calculated including scattered rays.

A structure which may be adopted to achieve the original object is not limited to that obtained by the pear-skin-like surface forming, insofar as an electroconductive film is provided on the sensor substrate in such a manner as to prevent the pertinent surface of the film from reflecting light by the concave mirror effect in which light is concentrated as it is reflected by a concave mirror.

The sensor element mounting substrate should preferably be formed of an insulating material. "The vicinity of the portion where elements are mounted" are the portions where the elements are mounted and peripheral portions. These "peripheral portions" correspond to, for instance, a region forming a space which inevitably results from the thickness of the sensor elements even when the electroconductive film and the sensor mounting substrate are pressed together by the platen roller.

The qualities or states of being "light-transmissive" and "transparent" are influenced by the light source used. Light which can be used is light whose wavelength is within a region that can be sensed by the sensor elements used. If the sensor elements are formed of a—Si (amorphous silicon), visible rays in general can be used.

The base, which accommodates the light source, may also serve as the sensor mounting substrate.

The provision of the electroconductive transparent film on the sensor substrate makes it possible to obtain a direct-contact-type image sensor which can be manufactured easily and exhibit stable reading performance. Since the electroconductive transparent film easily undergoes elastic deformation when it is subjected to load, it is less vulnerable to breakage. Further, since the electroconductive transparent film acts as a shield from electric waves and electrostatic induction, it provides the effect of preventing any noise which might adversely affect the signal output of the direct-contact-type image sensor. Furthermore, the film, which serves as a spacer between the relevant surface of the original and the sensor elements, also serves as an illumination-light transmission spacer and as a wear-resistant protective film. By virtue of these effects, the direct-contact-type image sensor facilitates assembly while ensuring stable reading performance of the same level as what has been conventionally achieved.

In the case where one surface of an electroconductive film is subjected to pear-skin-like matted surface forming, and the thus-formed pear-skin-like surface is disposed on the upper surface of the sensor elements, when illumination light is projected from the reverse side of the sensor substrate, rays of the illumination light are scattered by the pear-skin-like surface as they are transmitted or reflected. When the original is pressed against the film, the electroconductive film which has been pear-skin-like matted is deformed in such a manner as to vary the direction in which the rays are reflected. On the other hand, in the case of a smooth surface which has not been pear-skin-like matted, some rays of the illumination light are reflected by the mirror surface in such a manner as to become incident on the sensor elements, thus becoming extra incident rays in addition to rays reflected by the original. In such cases therefore, the problem is raised in which the sensor output that indicates "white" becomes abnormally great. In contrast, the adoption of a pear-skin-like matted surface makes it possible to scatter rays, not excepting rays being reflected by the film surface and, hence, to prevent the above-described adverse effect of reflected rays. This feature enables the elimination of any abnormal "white"-indicating output resulting from the reflection of light by the film surface, thereby ensuring stable reading performance, together with the above-described effects.

According to the present invention, therefore, by virtue of the use of an electroconductive transparent film which can be easily deformed, manufacture of the direct-contact-type image sensor is easy and the reading performance of the image sensor is stable.

DESCRIPTION OF THE PREFERRED EMBODIMENTS

Figure 1:
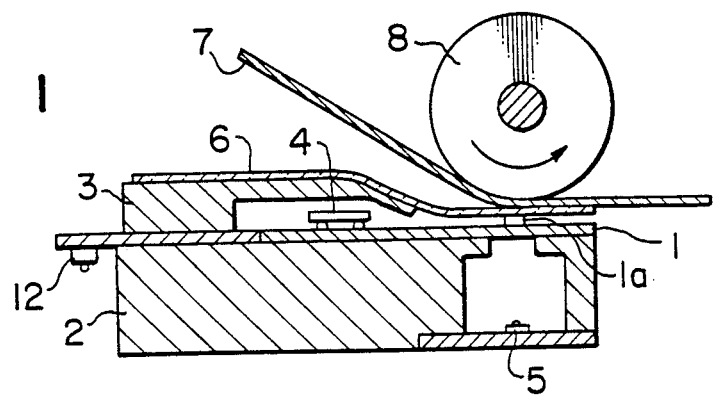
FIG. 1 is a sectional view of an image sensor assembly in accordance with one embodiment of the present invention.
Figure 2:
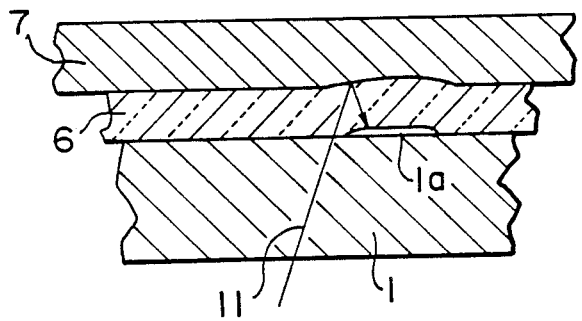
FIG. 2 is a sectional view of an image sensor used in the embodiment shown in FIG. 1.
Figure 3:
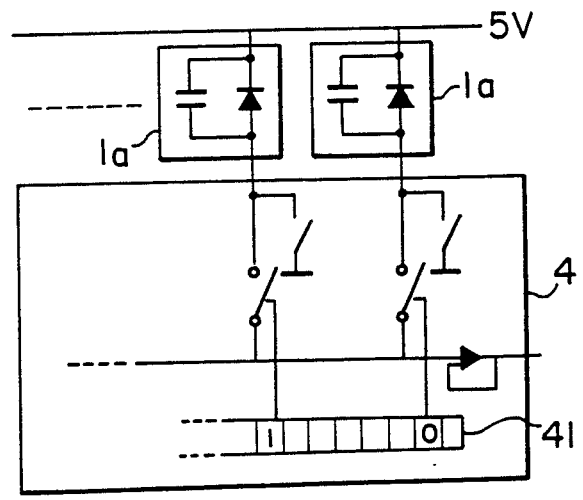
FIG. 3 is a circuit diagram of sensor element 1a and IC 4 which are used in the embodiment shown in FIG. 1.

Embodiments of the present invention will be described hereunder. FIG. 1 shows one embodiment in which a direct-contact-type image sensor of the present invention is incorporated in a image sensor assembly. FIGS. 2 and 3 show essential parts of the image sensor assembly.

Referring to FIG. 1, the image sensor assembly includes a sensor substrate 1, a plurality of sensor elements 1a, a mounting base 2, an IC cover 3, a sensor driving IC 4, a light source 5, an electroconductive transparent film 6, and a platen roller 8. Reference numeral 7 denotes an original with information to be read. The light source 5 comprises an LED (light emitting diode), and illumination light 11 can be generated therefrom. Reference numeral 12 denotes a connector.

The light source 5 is accommodated in the mounting base 2 on which is disposed the sensor substrate 1. A portion of the sensor substrate 1 is light-transmissive, and this light-transmissive portion is on the optical path of light from the light source 5. The sensor elements 1a are also disposed on this optical path, and are covered by the electroconductive film 6. The film 6 extends to the IC cover 3 within which the sensor driving IC 4 is disposed. In this example, the sensor elements 1a are arranged in correspondence with B4 paper, with 2048 sensor elements being arranged in one line, and they are adapted to operate at the speed of 1 $\mu$s per element, and 5 ms per line. An example of the wiring relationship between the IC 4 and the elements 1a is shown in FIG. 3.

The direct-contact-type image sensor of this embodiment operates in the following manner. When illumination light is generated by the light source 5 from the reverse side of the sensor substrate 1, the illumination light transmits through the light-transmissive portion of the sensor substrate 1 and the electroconductive transparent film 6 to illuminate the original 7. Rays of the illumination light are reflected by the original 7 at intensities corresponding to the degree of brightness and darkness on the pertinent surface of the original 7, and then become incident on the sensor elements 1a which perform photoelectric transfer. By this action, photoelectric current proportional to the quantity of light flows through the sensor elements 1a. The resultant signal is detected to enable reading of the original 7. The sensor elements 1a usually comprise a multiplicity of sensor elements arranged in a line. The elements are sequentially and alternatively driven by the sensor driving IC 4 to read one line. When the reading of one line has been completed, the pattern roller 8 is rotated to advance the original 7, so that the next line will be read. At this time, because the original 7 rubs against the electroconductive transparent film 6, static electricity is generated. If no electroconductive transparent film were provided, static electricity and peripheral electric waves might induce noise in the sensor elements 1a and the circuit wirings, making the output signal unstable. In contrast, with electroconductive transparent film 6 provided, the sensor elements 1a and the like are shielded by the film 6 from such induction, thereby providing the effect of ensuring stable outputs.

Since the electroconductive transparent film 6 can be easily deformed when it is subjected to external force, it does not become broken easily. This facilitates its assembly and increases the level of reliability.

In order to form the electroconductive transparent film 6, light-transmissive materials such as polyester, nylon, and acrylic materials may be used. The electroconductivity can be easily imparted by using transparent electroconductive materials such as ITO (indium-tin oxide) and tin oxides, or by coating a metallic thin film. The sheet resistivity should preferably be less than 100 $K\Omega/\square$. Electroconductive transparent films used in other embodiments, described later, may be formed of similar materials.

FIG. 3 shows the internal arrangement of the IC 4. Reference numeral 41 denotes a shift resister which is turned on where the data is 1 to extract an output signal. In this manner, the sensor elements 1a are sequentially and alternately driven by the sensor driving IC 4 to read information on one line.

Figure 4:
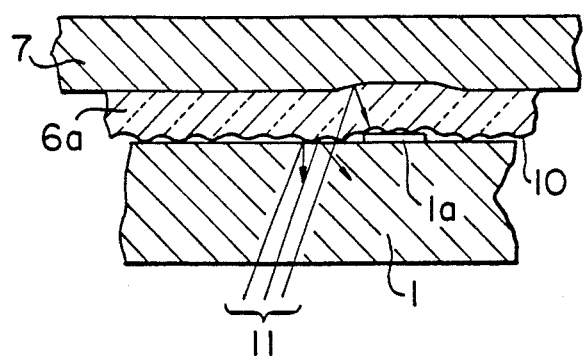
FIGS. 4, 5, and 6 are sectional views of image sensors in accordance with other embodiments of the present invention.

FIG. 4 shows another embodiment in which a direct-contact-type image sensor has the same arrangement as that shown in FIG. 2, except that the electroconductive transparent film 6 is substituted by an electroconductive transparent film 6a which has been subjected to pear-skin-like matted surface forming and which is thus provided with a pear-skin-like surface 10. By virtue of this arrangement, this embodiment provides, in addition to those provided by the embodiment shows in FIG. 1, the effect in which abnormalities in the output resulting from the reflection of rays by the film surface are prevented, thereby making it possible to obtain stable output signals. More specifically, in the case where the surface of the electroconductive transparent film that is closer to the sensor substrate 1 is smooth, when the original 7 is pressed against the sensor to be brought into close contact therewith, the film is deformed. The surface of the deformed film may reflect part of the rays of the illumination light in such a manner as to make it easy for the part of the rays to become incident on the sensor elements. If such is the case, the sensor elements will receive extra rays in addition to rays reflected by the original surface, and the resultant output signal will be abnormal. In contrast, in the case where the relevant surface of the film is formed as a pear-skin-like surface as in this embodiment, because the pear-skin-like surface reflects part of the rays of the illumination light in such a manner as to scatter them, it is possible to obtain stable output signals. Another advantage of this embodiment is that the pear-skin-like matted electroconductivity transparent film 6a can be replaced easily when its surface is soiled, and thus can facilitate maintenance.

Figure 5:
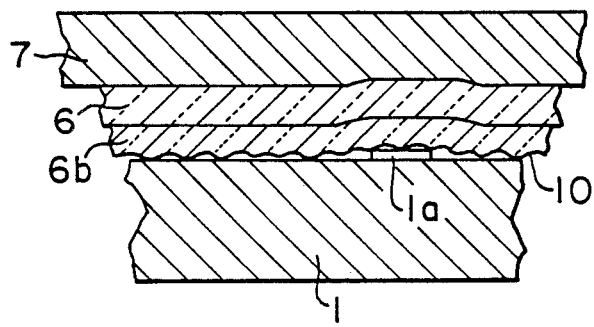

A further embodiment is shown in FIG. 5. The structure of this embodiment is the same as that shown in FIG. 4 except that the pear-skin-like matted electroconductivity transparent film 6a is substituted by an electroconductivity transparent film 6 and a pear-skin-like matted film 6b.

In this structure, the electroconductive transparent film 6 provides the same effect as those provided in the first embodiment, while the pear-skin-like matted film 6b provides the same effects as those provided by the pear-skin-like surface 10. According to this embodiment, the adoption of two separate films makes it possible to use commonly-used films, thereby enabling production at low cost.

A still further embodiment will be described with reference to FIG. 6. The structure of this embodiment is distinguished from others by an arrangement where an electroconductive transparent film 6, which is the same as the film 6 shown in FIG. 2, is bonded to the sensor substrate 1 through an adhesive layer 9.

This embodiment provides, in addition to the effects provided by the first embodiment, the effect in which abnormalities in the output resulting from the reflection of rays by the surface of the electroconductive transparent film 6 that is closer to the sensor substrate 1 is prevented. Specifically, the provision of the adhesive layer 9 makes it possible to restrain the deformation of the electroconductive transparent film 6. In addition, since the difference in refractive index between the electroconductive transparent film 6 and the adhesive layer 9 can be usually small, the reflectivity at the interface of the film 6 and the layer 9 is small. These effects combined serve to prevent part of the illumination light from becoming incident on the sensor elements 1a and, hence, from causing abnormalities in the output.

In a further embodiment, consideration is given to the point of preventing part of illumination light reflected by the surface of the electroconductive transparent film from becoming incident on the sensor elements. In this further embodiment, an electroconductive transparent film 6 is disposed on the sensor substrate 1 as shown in FIG. 2, and, in addition, provided is a means to prevent rays reflected by the surface of the electroconductive transparent film 6 that faces the sensor substrate 1 from becoming incident on the sensor elements 1a. By virtue of this arrangement, rays reflected by the original 7 are mainly incident on the sensor elements 1a, thereby enabling stable reading. The use of an electroconductive transparent film provides the same effects as those described concerning the first embodiments.

Figure 6:
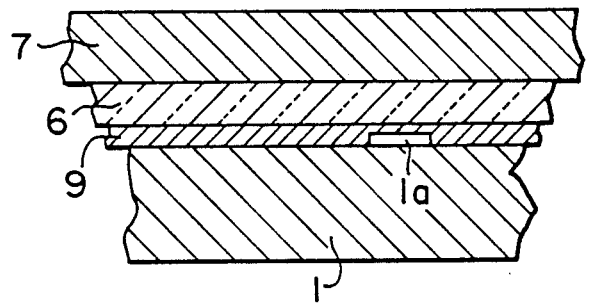

Although the adhesive layer 9 is interposed in the embodiment shown in FIG. 6, an alternative arrangement may be adopted in which the electroconductive transparent film 6 is directly attached to the substrate 1 without using such an adhesive layer. If an adhesive is to be used, a transparent adhesive should be used at least at certain portions so that the optical path would not be obstructed.

Figure 7:
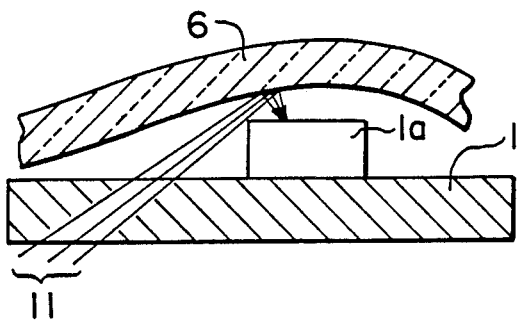
FIG. 7 is a sectional view of an image sensor shown as an example to be compared with the present invention.

FIG. 7 shows the concave mirror effect. In the case illustrated, the reverse surface of the film 6 provides the concave mirror effect whereby rays 11 are concentrated as they are reflected, to become incident on the elements 1a. If the reverse surface of the film 6 is pear-skin-like matted, rays 11 can be scattered, thereby reducing the quantity of light that are reflected and become incident on the elements 1a.

What is claimed is:

1. A facsimile equipment comprising:

a direct-contact type image sensor including a plurality of sensor elements, a sensor element mounting substrate, having a surface on which the plurality of sensor elements are mounted and which is light-transmissive at least in the vicinity of portions of the sensor element mounting substrate where said sensor elements are mounted, and an electroconductive transparent film disposed on a surface of said substrate which is adjacent said sensor elements, having a surface facing the sensor elements, the film having one portion disposed in such a manner as to cover the plurality of said sensor elements and another portion adhered to an IC cover within which a sensor driving IC is disposed, said surface of said film facing the sensor elements being formed with fine surface irregularities at least over said sensor elements and at portions in the vicinity of said sensor elements;

an incident light optical path, extending through the light-transmissive portions of the sensor elements mounting substrate from a side of the substrate opposite to the side on which the plurality of sensor elements are mounted, at the location where the sensor elements are mounted; and a platen roller disposed on said one portion of the transparent film, capable of forcing an original to come into contact with a side of the electroconductive transparent film opposite to the side thereof closest to the substrate, in the vicinity of the sensor elements, whereby the transparent film is pulled in the direction of said one portion of the transparent film when the roller is rotated to advance the original.

2. A facsimile equipment as set forth in claim 1, wherein said surface of said film facing the sensor elements is formed with fine surface irregularities at least over the sensor elements and at portions in the vicinity of said sensor elements such that an incident light is made incident into said sensor elements after a part of the incident light is reflected from said fine surface irregularities and a residual part of the incident light is reflected from an interface of the original and said film.

3. A facsimile equipment as set forth in claim 1, wherein said electroconductive transparent film has an electroconductive transparent resin film and a non-electroconductive film, disposed on a surface of said substrate which is adjacent the sensor elements, in such a manner as to cover the plurality of said sensor elements, one surface of said non-electroconductive film, facing the sensor elements, being formed with fine surface irregularities at least over the sensor elements and at portions in the vicinity of said sensor elements, said one surface being disposed directly on the substrate in such a manner as to form spaces between the substrate and the said one surface.

4. A facsimile equipment as set forth in claim 1, further including a light source, disposed within a base on which the substrate is mounted, said light source forming part of the incident light optical path and ensuring illumination of the paper.

5. A facsimile equipment as set forth in claim 2, further including a light source, disposed within a base on which the substrate is mounted, said light source forming part of the incident light optical path and ensuring illumination of the paper.

6. A facsimile equipment as set forth in claim 3, further including a light source, disposed within a base on which the substrate is mounted, said light source forming part of the incident light optical path and ensuring illumination of the paper.

7. A facsimile equipment as set forth in claim 1, wherein the platen roller is disposed in such a manner as to advance the original in the direction of the one portion of the electroconductive transparent film from the other portion thereof.

8. A facsimile equipment as set forth in claim 2, wherein the platen roller is disposed in such a manner as to advance the original in the direction of the one portion of the electroconductive transparent film from the other portion thereof.

9. A facsimile equipment as set forth in claim 3, wherein the roller is disposed in such a manner as to advance the original in the direction of the one portion of the electroconductive transparent film from the other portion thereof.

* * * * *